June 5, 1934.  E. J. MAUST ET AL  1,961,232
OIL DRILL MUD RECLAMATION
Original Filed Jan. 20, 1931
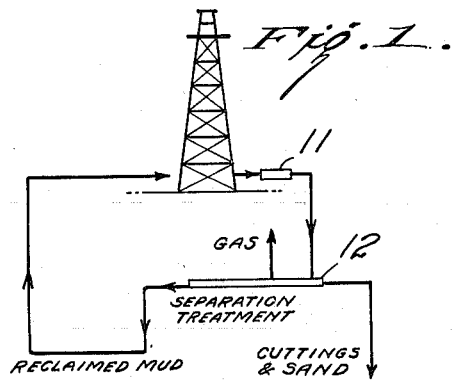
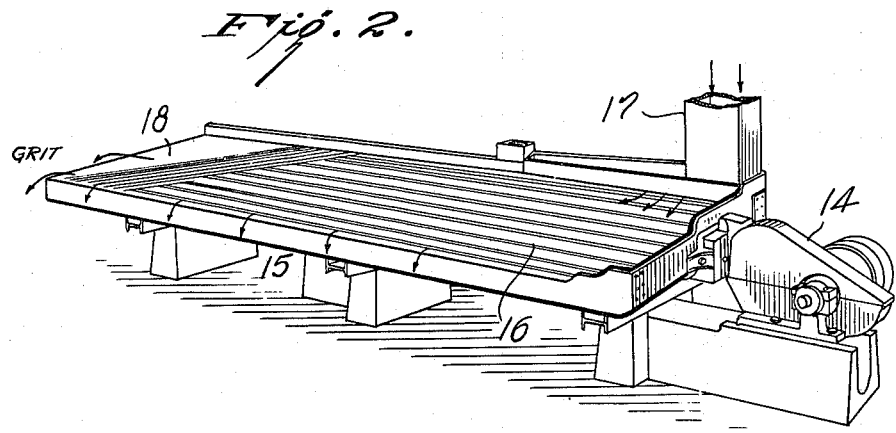
Inventors
GORDON L. BENJAMIN,
ERNEST J. MAUST,
By Arthur Middleton
Attorney Patented June 5, 1934

1,961,232

UNITED STATES PATENT OFFICE 1,961,232

OIL DRILL MUD RECLAMATION

Ernest J. Maust, New York, N. Y., and Gordon L. Benjamin, Los Angeles, Calif., assignors, by mesne assignments, to The Dorr Company, Inc., New York, N. Y., a corporation of Delaware Application January 20, 1931, Serial No. 509,922
Renewed March 12, 1932

3 Claims. (Cl. 209—2)

This invention relates to reclaiming or reconditioning the mud used in connection with oil wells sunk by drilling.

Mud of a certain consistency is flowed or pumped down the oil well while it is being drilled, for the purpose of carrying away the rock cuttings from the drill and for sealing the rock fissures through which the hole passes. This mud is continually circulated by means of pumps while the drilling progresses.

In its circulation through the well, the drill mud becomes contaminated with one or more of four impurities which render it unsuitable for further use. These impurities are sand, gas, oil and water. It has been the practice to discard the mud after it has been contaminated.

This invention has for its object devising a method of and means for reclaiming or cleaning the mud without first diluting it to relieve it of its impurities so it may be re-used.

Where there are many oil wells in a field, a stationary central mud reclaiming or cleaning plant can be set up but where a well is isolated, such a central plant is not practicable. Therefore, a further object of this invention is to devise a mud reclaiming mechanism which is transportable whereby it can be moved from well to well as needed.

In central reclaiming plants thickeners or dehydrators can be used to thicken the reclaimed mud which has been initially diluted to facilitate sedimentation. But if a reclaiming apparatus is to be transportable, a thickener cannot be used. This makes it necessary not to dilute the mud to be treated to an extent requiring subsequent thickening.

General description

The theory governing the manner in which cuttings are removed from rotary drill mud in the working of this invention is that the yield value of a plastic fluid such as drill mud is reduced by mechanical agitation and vibration. This reduction in yield value, sometimes called shear value, allows sand cuttings to start to fall due to the force of gravity.

When only a thin layer of mud is so vibrated the distance to fall is not great until the sand particle, or cutting, has passed to the surface of the device that has produced these vibrations or agitations. After falling to this surface the sand particle tends to remain in contact with this surface due to the surface-tension of the fluid around the particle. As the velocity across this vibrating surface is substantially low, there is little tendency to move the particle in the direction of flow.

The desirable motion of the surface at an angle to the direction of flow is such that the forward stroke is substantially a long and slow one, while the return stroke is of shorter duration. This causes the adhering sand particle to move at substantially right angles to the direction of flow and in the direction of the forward or slow stroke. The surface should be inclined so that the sand particles move also up and out of the mud, thus being separated and in condition to be discarded. The sand-free mud thus passes across the separating surface or device and is thus made ready for re-use in the drilling operation.

The yield or shear value of a fluid such as rotary drill mud can be reduced in a number of ways. Chemicals such as sodium silicate and/or sodium carbonate, gum arabic, etc. tend to disperse the mud thus reducing its tendency to hold cuttings in almost permanent suspension. Mechanical vibration or agitation tends to further reduce this yield value. It is the purpose of this invention to make use primarily of the mechanical reduction of yield value, but the operation may combine chemical reduction in addition to mechanical reduction.

Mechanical reduction of yield value may be obtained either by imparting flow to the mud in a thin stream over frequent obstructions such as riffles, or by vibrating or agitating the surface over which the mud flows, or by combination of these two methods. A device such as a concentrating table combines these two methods. This invention recognizes that the process of mechanical reduction of yield value may be obtained by the use of either method alone.

In addition to these methods, the vibration or agitation of the mud may be accomplished by a third method. This may consist of vibrating wires or other elements that may be in contact with the mud while passing over riffles when the surface over which the mud passes is being vibrated or agitated, or by combining this third method with either of the two alone.

In the theory of the working of this invention it is further recognized that the surface-tension of the fluid around the sand particle is important in that it holds the particle that has been dropped to the surface by the reduction in yield value. The particle thus held to the surface is in condition to be moved out of the mud stream by one of a number of methods.

One method previously described is that of the method of applying motion to a surface such as in a concentrating table, wherein the difference in duration of stroke causes the particle of sand to move in the direction of the longest stroke duration.

Other methods may be used in the working of this process of removing sand or grit from a substantial thin stream of mud after it has been released and settled to the surface by mechanical reduction of yield value.

These methods may consist of some scraping device that passes over the surface upon which the sand had dropped. Another method that may be used may consist of a surface that passes continuously out of the mud, such as vibrating belt conveyor. Another method may make use of a circular motion imparted to the surface in such a manner that the surface containing the sand moves out of the mud to allow the sand to be removed by scraping or washing or some other suitable method.

A further recognition of the value of reduction of yield value of mud fluids is that this reduction allows gas to escape from the mud, and agglomerates oil and oil emulsions so that they can be removed by skimming. It is also recognized that the release of gas and agglomeration of oil emulsions may have some benefit in helping to drop out sand cuttings.

By way of illustration, this invention may be said to contemplate the breaking down of flocs which surround the impurities of the mud and normally prevent their easy separation. To use a well known example, consider several chestnut burrs in a group. Their spines interlock so that it is difficult to move one burr from another. However, when the interfering spines are removed, it is easy enough to remove one burrless chestnut from another.

So, it is the purpose of this invention to first remove the interlocking or interfering flocs which surround each gritty impurity like spines, whereupon it is then fairly simple to separate and remove the gritty particles from the mud.

To say it still another way, this invention contemplates making use of mechanical reduction of yield value so that the gritty particles fall to an inclined surface or deck and interfacial tension is then made use of in removing the gritty particle from the mud body.

In order to make the invention more clearly understood, it has been illustrated in the accompanying drawing but because of the wide range of devices which can be used to carry out the invention the embodiments of the invention shown in the drawing is more or less diagrammatic.

The drawing

Figure 1 is a flowsheet. Figure 2 is a perspective view of one form of vibrating separation deck.

Detailed description

As indicated in Fig. 1 the mud is flowed from the well, preferably through a flume or storage tank 11 to a zone of treatment 12 wherein the gritty impurities such as cuttings and sand, and any gas or oil entrapped in the mud are removed therefrom, whereupon the reclaimed or reconditioned mud is returned to the well for re-use.

The means used for subjecting the mud to separation or reclamation treatment may be in the form of, or any combination of the devices hereinafter described.

In Fig. 2 there is illustrated a reciprocating deck over which the mud flows whereupon by meeting obstructions the flocs therein are broken down or its plasticity reduced; its gritty impurities are thereby permitted to settle; the entrapped gas is released; and the gritty impurities are discharged from one part of the deck while the purified mud flows from another part.

More particularly, an inclined deck 13 is arranged to be vibrated or reciprocated by any suitable head motion 14. The deck has adjustable supports 15 which permit of this reciprocation motion. 16 indicates riffles or similar flow obstructing means. Mud is applied to the deck 13 through the feed box 17. 18 indicates a sloping section or plateau on the deck. The cuttings and sand separated from the mud are discharged off of the end of the deck while the reclaimed mud flows off of its side.

The deck over which the mud to be treated is flowed may be made of or have a surface in which is incorporated linoleum; cork; rubber; glass; iron either uncoated or coated with paint or enamel; or asphalt. That is any such surface or combination surface may be used which will aid in making use of interfacial tension to separate the impurities from the mud.

Operation

Referring to Fig. 2, the mud from the well is fed through the feedbox 17 to flow down over the longitudinally extending riffles or baffles 16 on the transversely inclined deck 13 while the deck is being reciprocated by the head motion 14 in a manner whereby the return stroke of the deck is faster than the outgoing stroke. The mud in flowing over the obstructions or riffles has its flocs broken down or its plasticity reduced which in turn allows its heavier impurities to settle. And the reciprocation of the deck lengthwise in the direction of the riffles causes the gritty impurities, settling from the mud and caught between adjacent riffles by interfacial tension to be carried and guided along by the riffles. By means of the differential speed of the reciprocating strokes given the deck, the gritty impurities are propelled stepwise along between the riffles and are thus conveyed up to and upon the sloping zone or plateau 18 of the deck from which they are discharged at its end. By having the inclination of the deck 13 adjustable both from end to end and from side to side such as by legs 13a, a certain control is possible of the efficiency of the separation of the gritty solids. That is, by varying the side to side inclination, the speed of mud flow over the deck is controlled. Whereas by end to end inclination the size of the separated gritty particles is controlled. Meanwhile the mud continues its course in flowing down over the riffles and finally drops off the lower longitudinal side.

So in passing down over the deck 13, the mud has its flocs broken down; its solid impurities settle which are then separated from it and later separately discharged; any entrapped gas is liberated from the mud due to its agitation; and the reclaimed mud is discharged separately from its eliminated impurities.

Thus the invention has been shown to be capable of embodiment in varying types of apparatus with a wide range of details and combinations to choose from, and still others not shown are possible so long as the oil drill mud first has its flocs broken down or dispersed to permit its solid impurities to settle whereupon they can then be removed from the mud.

Whereas, the breaking down of flocs in the mud has been referred to, the idea intended to be conveyed is the reduction of yield value of the mud, or the reduction of its plasticity, or the increase of its fluidity; whereby its tendency to hold impurities in suspension is materially affected.

We claim:

1. A method of treating oil drill mud as it comes from the oil well to remove impurities suspended therein during its use in the well, which consists in flowing the mud in a stream over a surface, changing the fluidity of the mud during its flow to cause its solid impurities to become dis-entrapped and to sink to the bottom of the mud stream and to the said surface, the mud being undiluted to an extent requiring subsequent thickening, and then removing the solids from said surface.

2. A method of treating oil drill mud as it comes from the oil well to remove impurities suspended therein during its use in the well, which consists in flowing the mud in a stream over a surface, mechanically decreasing the plasticity of the mud during its flow to settle the suspended solid impurities to said surface, removing the settled solids from the mud flow and then removing the solids upon the surface by vibration thus rendering the mud so treated fit for reuse without requiring thickening or dewatering.

3. A method of the type of claim 2 in which the plasticity is decreased chemically as well as mechanically.

ERNEST J. MAUST.
GORDON L. BENJAMIN.